United States Patent [19]

Andersson

[11] 4,024,536

[45] May 17, 1977

[54] METHOD AND A DEVICE FOR CHARACTER PRESENTATION

[76] Inventor: Leif Georg Lennart Andersson, Henriksbergsvagen 104, Handen, Stockholm, Sweden, S-136 67

[22] Filed: Sept. 16, 1975

[21] Appl. No.: 613,735

[30] Foreign Application Priority Data

Sept. 20, 1974 Sweden .............................. 7411842

[52] U.S. Cl. .............................. 340/407; 340/365 C
[51] Int. Cl.² ............................................ G08B 3/00
[58] Field of Search ........... 340/407, 365 R, 365 C, 340/149 R; 35/6, 35 A; 324/66

[56] References Cited

UNITED STATES PATENTS

| | | | |
|---|---|---|---|
| 2,200,206 | 5/1940 | Myers | 340/149 R |
| 3,395,247 | 7/1968 | Fieldgate | 340/407 |
| 3,584,398 | 6/1971 | Meyer et al. | 35/6 |
| 3,740,644 | 6/1973 | Schag et al. | 324/66 |
| 3,772,685 | 11/1973 | Masi | 340/365 C |
| 3,831,065 | 8/1974 | Martin et al. | 340/149 R |
| 3,903,380 | 2/1975 | Schomburg | 324/66 |

*Primary Examiner*—Marshall M. Curtis
*Attorney, Agent, or Firm*—Lowe, King, Price & Markva

[57] ABSTRACT

A method and a device for presenting digits, letters and other characters uses a number of signals for representing each character. Said signals are combined with signals from manually operable touch point electrodes. When predetermined electrodes are operated simultaneously with reception of a predetermind character signal or character signal combination, the combining means activates an acoustic, visual or tactile output signal so that a character representing signal code can be recognized. A code conversion between the input signals and the output signals can be provided so that the output character is presented in a code with fewer elements than the input character.

10 Claims, 4 Drawing Figures

METHOD AND A DEVICE FOR CHARACTER PRESENTATION

The present invention is related to a method of non-visual presentation of digits, letters or other characters. It is furthermore related to a device for carrying out the method, and this device is preferably intended for use with character display devices of the type in which each character is presented by illumination of some of seven separate segments which together form the character to be presented.

An increased use of devices with digital displays, such as digital measuring instruments and electronic calculators, has created a growing demand for displays that can be used also by visually handicapped persons. The characters or symbols must then be presented by some other sense than sight. Usually a tactile or acoustic presentation is used. In the case of tactile presentation, a signal must be produced that can be felt and identified. Usually one tries to produce a tactile pattern that corresponds to the Braille symbols. This can be done by magnets lifting small pins, electronically controlled air currents, piezoelectric elements, temperature-controlled changes of volume or direct electric stimulation of the skin. Acoustic presentation is usually provided by a selection of recorded number.

This invention aims at producing a small and inexpensive display device in which the characters or symbols are presented preferably in a code of signal or no signal when a number of points or areas are activated.

A device of this type can be built also in small numbers at a far lower cost than the displays for visually handicapped that are used at present. It can also be made up by a few standard components with a well-known and long lifetime, which will give a high reliability.

When presenting a symbol through another sense than sight one can use a signal that is either generated or not generated. One can e.g. press a button. If then a buzzer sounds this means one character, e.g. "1", and if it does not sound it means another character, e.g., "0". By using one more button more characters can be presented, e.g. no sound when pressing the first button and the second one can mean 0, a sound when pressing the first and no sound when pressing the second button can mean 1, no sound when pressing the first and a sound when pressing the second button can mean 2, and a sound when pressing the first button and the second one can mean 3. In this way one button can be used to present 2 characters, two buttons 4 characters, three buttons 8 characters, four buttons 16 characters, five buttons 32 characters, etc. Consequently, in order to present one of our usual ten digits non-ambiguously at least four buttons are needed. To present one letter non-ambiguously at least five buttons are needed. In some cases it might be advisable to use more buttons than necessary. Six buttons should e.g. be used to attach the code to the 6-point code of Braille or to produce a code to presenting both digits and letters non-ambiguously. Seven buttons should be used to adapt the code to the 7-segment code of ordinary visual displays.

The invention will become fully apparent upon consideration of the following detailed description of two embodiments, especially when taken in conjunction with the accompanying drawings, wherein FIG. 1 is a plan view of a device according to the invention for presentation of six characters.

In the above description buttons have been mentioned. These can, of course, be replaced by other means, e.g. no-touch switches, photo cells or accelerometers. In the described embodiments the buttons have been replaced by touch-points and one bar in common for each character as shown in FIG. 1, showing a device for the presentation of six characters.

Figure 1:
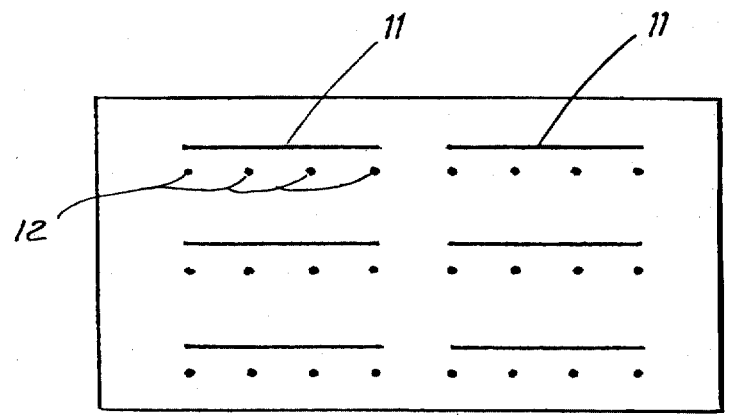

In FIG. 1 is schematically illustrated a support 10 having six metal bars 11, one for each character to be presented, and four touch-points, i.e., electrodes, 12 pertaining to each bar. Four touch-points 12 are positioned adjacent each of bars 11 in a group, and each touch-point is electrically insulated from the bar and the other touch-points in the same group. When a fingertip is placed over the bar and one touch-point the conductivity of the skin lowers the resistance between the bar and the touch-point, which can be used in the same way as a pressing down of a button. In the following text the term "points" will be used.

Figure 2:
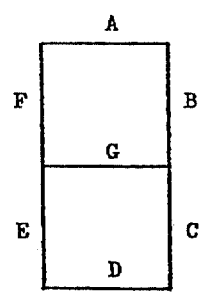
FIG. 2 shows the arrangement of the separate segments of a 7-segment character display device of the ordinary type.

One usual way of presenting digits and other characters is to use display devices. One characters are presented by illuminating some of the seven segments. The segments are connected in such a way that in a display for more than one character all the connections to the corresponding segments for separate characters are interconnected to provide seven connections for the whole display. Besides these connections there is added one connection for each character position so that an eight-character display has 7 + 8 = 15 connections. The characters are presented by supplying pulses to the segments to be illuminated in the first character position, and simultaneously supplying a pulse to the connection to the first character position. This last-mentioned pulse activates the first character position so that segments in it can be lit or illuminated by pulses at the segment connections. The segments in other character positions which are not activated in this way remain unlit. Then the second character is generated in response to new pulses on the segment connections and by supplying an activating pulse to the connection for the second character position etc. The characters presented on such a display blink at so high a frequency that they seem to glow steadily. A 7-segment character display is schematically shown in FIG. 2.

Although there are variations with regard to pulse, frequency, reference pulses, amplitude etc. the generation of seven-segment characters is rather similar for most devices and it is easy to find the different signals. Therefore, it is comparatively easy to supply a device having a seven-segment display with a connector receiving the signals to the seven-segment display. To this connector a device can be connected with seven points for each character and by searching these points one can determine the lit segments in each character position.

However, a device with seven points per character has the disadvantage that it must be rather big. Furthermore, it is difficult to recognize characters with as many as seven signals or elements. Therefore for digits it is convenient to convert the seven-element code to a four-element code. This conversion must be made so that all digits are unambiguously defined by the four-element code. It is also desirable for the code to be unambiguous for all types of seven-segment digits that are used. The converter should accept ┗ as well as ┗, ┪ as well as ┪ and ┐ as well as ┐. If the different segments are denoted according to FIG. 2 such a code conversion can be made so that a first signal is manually applied by a finger touching one of points 12 if segment E is lit, a second signal is manually applied by a finger touching another of points 12 if segment F is lit, a third signal is manually applied by a finger touching a third of points 12 if segments A and B are lit, and a fourth signal is manually applied by a finger touching a fourth of points 12 if segment C is lit and segments A or G or both are not lit. This type of code conversion can be performed by a circuit according to FIG. 3. A circuit according to FIG. 4 derives an unambiguous code except in the case when the digit 7 is presented as ┐.

Figure 3:
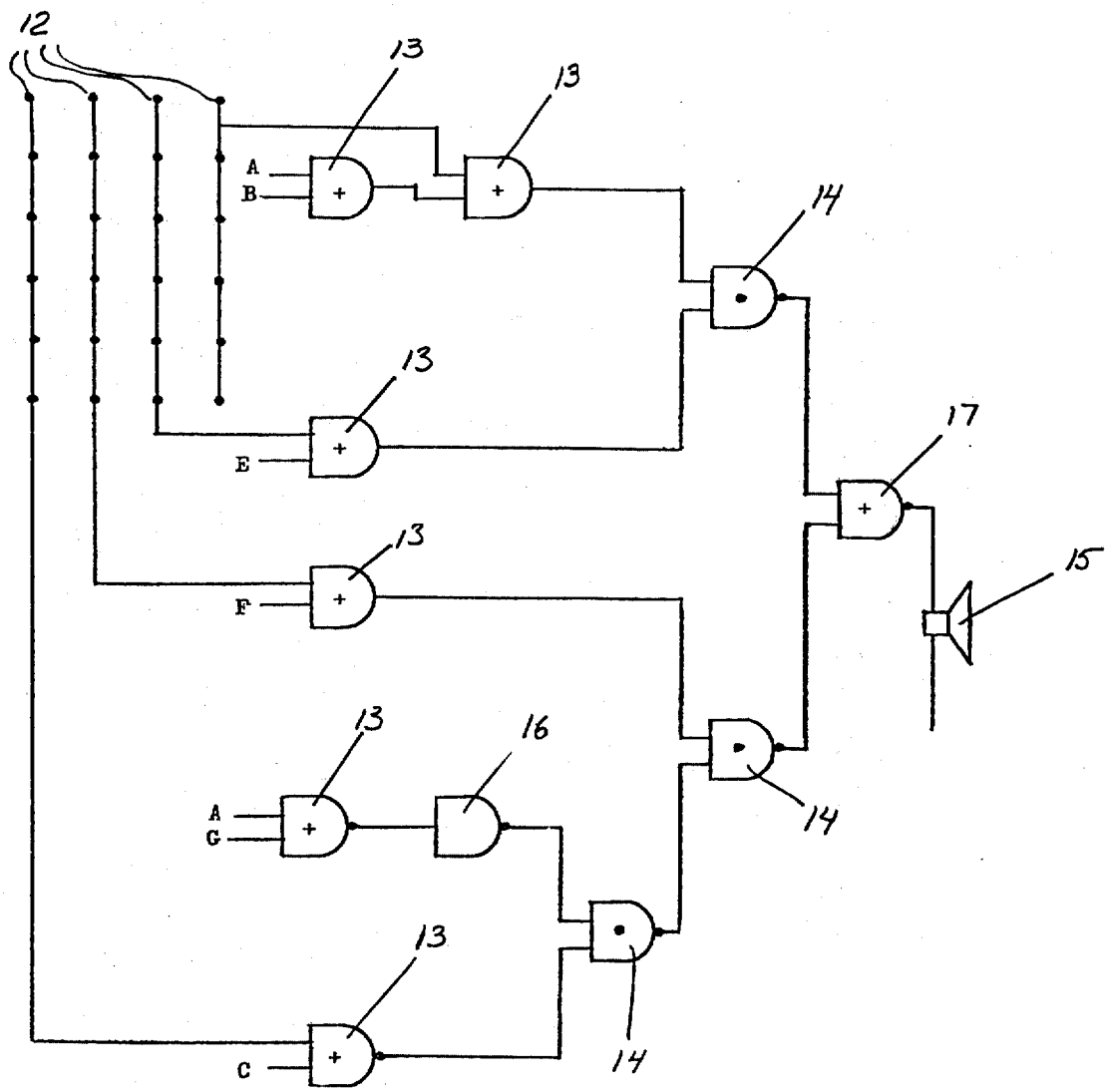
FIG. 3 shows one arrangement of the logical elements according to the invention.

In FIG. 3 there is illustrated a circuit diagram for the logical elements used for providing the desired code conversion and activation of signal means generating the desired output signal. In FIG. 3 a number of AND-circuits 13 are arranged to receive signals representing the illumination or non-illumination of the segments A-G as shown in FIG. 2 in a character display device. The code conversion used has been described above. The outputs of the AND-circuits are connected to inputs of a number of OR-circuits 14 in such a way that an unambiguous activating signal is generated and supplied to a signal means 15 transmitting a tactile or acoustic signal when activated. As indicated in FIG. 3, the signals are inverted in the OR-circuits 14 or in a separate inverter 16. The output signals from the last two OR-circuits 14 are combined in an inverting AND-circuit 17 before supplied to the signal means 15. The point array in the above left corner of FIG. 3 indicates the touch-points 12 for checking the presence or absence of the code elements in the four element output code actuating the signal means 15. The common metal bars 11 for each character shown in FIG. 1 have not been indicated in FIG. 3.

Figure 4:
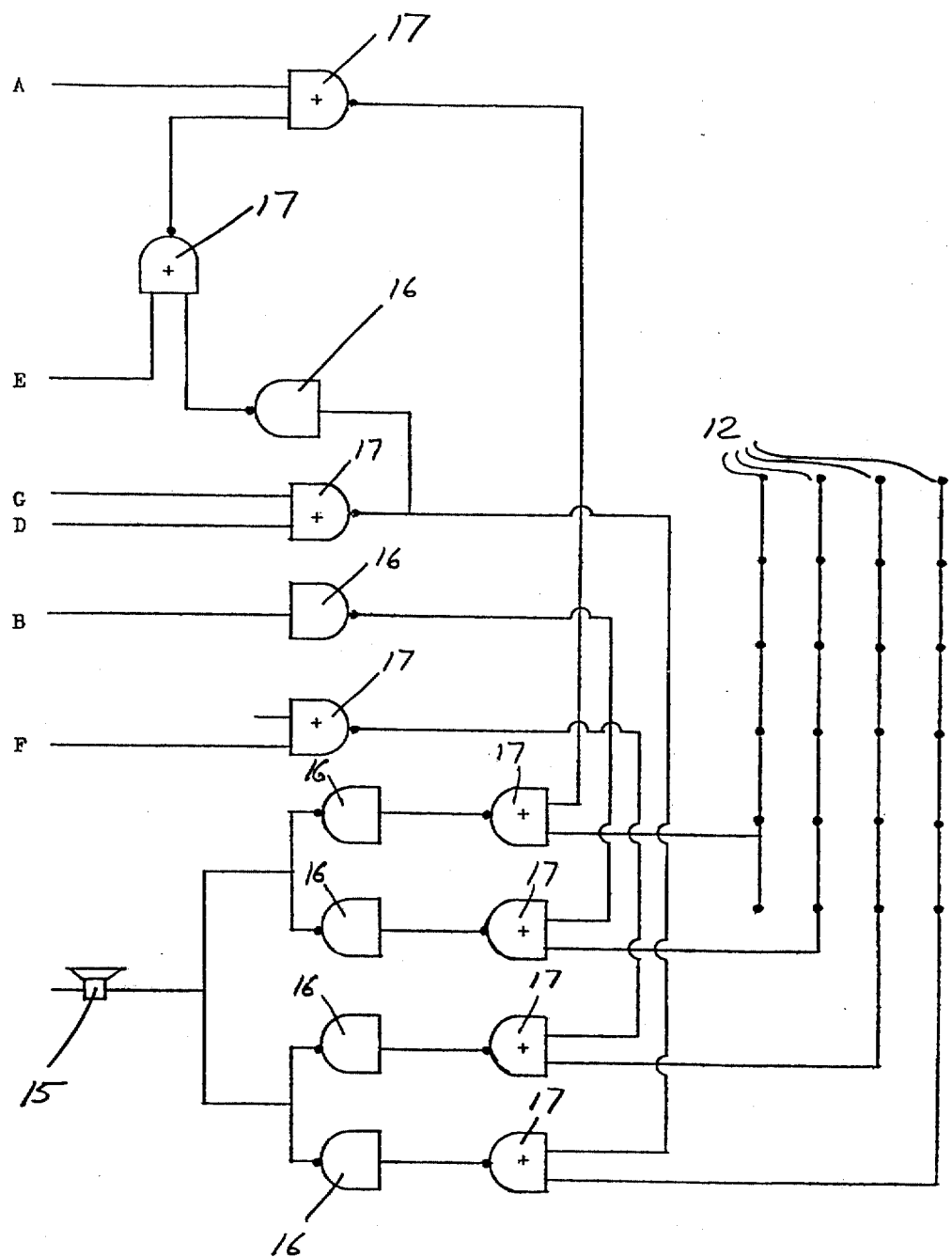
FIG. 4 shows another arrangement of the logical elements according to the invention.

What has been said above regarding FIG. 3 will also facilitate understanding of FIG. 4. Elements having the same logical operation have been given the same reference numerals in FIGS. 3 and 4. Thus, in FIG. 4 the reference numeral 12 indicates the touch-points, 15 the signal means, 16 inverters and 17 inverting AND-circuits.

As mentioned above, a device for the presentation according to this method may have for each character a common part e.g. a metal bar or other conducting or semi-conducting element plus touch-points close to it. When seven-segment characters are to be presented, the activation signal to the character position that is to be activated is supplied to this common part, in some cases through an inverter. All touch-points with the same position in the group are joined, i.e. all first points are connected with each other, all second points with each other, etc. These points are then connected with AND-circuits 13 in FIG. 3 and 17 in FIG. 4. The second inputs of these AND-circuits are supplied, in some cases after code conversion, with the same signals as are supplied the different segments of the seven-segment character, as indicted by the letters A-G. If the AND-circuits have a high impedance input, e.g. consist of MOS-circuits, a touch-point will have the same voltage as the common part of the character position when a fingertip is bridging the point and the common part. When the activating pulse to this character position arrives, the pulse will reach one input of the AND-circuit through the common part, the fingertip and the touch-point. Whether the AND-circuit then derives an output signal or not depends on the signal on the other input. Since the signal to the other input is supplied with the same signal as is supplied the segments of the seven-segment character the result depends on which pulses to the segments arrive simultaneously with the activation signal for the character position.

With seven touch-points and corresponding AND-circuits connected directly with the signals to the segments, one can search or check these points. At those points where the AND-circuits derive a signal one knows that there are pulses to the segment and an activation pulse simultaneously, i.e. the segment is lit. Thus, it is possible to identify and present the character in this way. Also with a code conversion of the signals to the segments before the AND-circuits the function is principally the same.

The circuits in FIGS. 3 and 4 should have positive-going pulses to the segments and positive-going activation pulses. Normally the activation pulses are negative-going and must be supplied through inverters. If one wants to use the activation pulses without inversion the AND-circuits can be replaced by OR-circuits.

The above described invention is primarily intended to aid persons with a visual handicap. However, many persons having a visual handicap still have the ability to distinguish between light and darkness, i.e. they are able to notice whether e.g. an indicator lamp is lit or not. For such persons a display using indictor lamps can be used for transmission of the output signals.

What is claimed is:

1. A method of non-visual presentation of digits, letters or other characters comprising the steps of generating a number of signals for each character, said signals representing the character in a special code; transferring each signal to a manually operable touch-point means; operating the touch-points of said touch-point means in a predetermined sequence to derive successive responses for the operated touch-points; and in accordance with the responses, deriving non-visual output signals which can be perceived by a human, so that an output signal combination identifying a particular character is generated when touch-points pertaining to said particular character are operated.

2. The method according to claim 1, wherein each character identifying signal combination is obtained by successively operating four-seven touch-points.

3. The method according to claim 2, wherein standard signals for illuminating a seven-segment character display are used as input signals for each character, and said output signal combination is generated by operating four touch-points, said input signals controlling said touch-point means in such a way that the output signal combination depends on one touch-point response corresponding to a signal for the lower left vertical segment of the seven-segment character; a second touch-point response corresponding to a signal for the upper left vertical segment; a third touch-point response corresponding to the signals for both the upper horizontal segment and the upper right vertical segment; and a fourth touch-point response corresponding to the signals for the upper horizontal segment, the intermediate horizontal segment and the lower right vertical segment.

4. The method according to claim 2, wherein the standard signals for illuminating a seven-segment character display are used as input signals for each character, and said output signal combination is generated by operating four touch-points, said input signals controlling said touch-point means in such a way that the output signal combination depends on one touch-point response corresponding to a signal for the upper right vertical segment of the seven-segment character; a second touch-point response corresponding to a signal for the upper left vertical segment; a third touch-point response corresponding to the signals for the lower or upper horizontal segment and for the intermediate horizontal segment; a fourth touch-point response corresponding to the signals for the upper or lower horizontal segment, for the intermediate horizontal segment and for the lower left vertical segment.

5. The method according to claim 4, wherein the fourth touch-point response also corresponds to the signal for the lower horizontal segment.

6. A device for non-visual presentation of digits, letters and other characters, comprising means for generating a number of input signals for each character, said input signals representing the character in a special code; a touch-point means comprising a number of manually operable touch-points for each character to be presented, said touch-point means receiving the input signals representing the character; and a signal means adapted to generate a non-visual output signal, said touch-point means activating said signal means when a touch-point is operated and said touch-point means at the same time receives a predetermined signal combination from said input signal generating means.

7. A device according to claim 6 for use in connection with a seven-segment character display including means for transferring the signals for illuminating selected segments of said seven segments to said manually operable touch-point means as character representing input signals, said touch-point means comprising an insulated support having one conducting element for each character to be presented and a group of conducting areas for each character, said conducting areas being positioned adjacent the pertaining conducting element but insulated from said element and the other conducting areas in the same group; and a number of logic circuit means connected to be responsive to the input signals for activating said signal means to generate an output signal when the impedance between the conducting element and a conducting area in the pertaining group of areas is reduced and at the same time a predetermined input signal combination is supplied to the said logic circuit means.

8. A device according to claim 7, wherein each group contains four conducting areas and the corresponding conducting areas in the separate groups are connected to each other.

9. A method of presentation of digits, letters or other characters comprising the steps of generating a number of signals for each character, said signals representing the character in a special code; transferring each signal to a manually operable touch-point means; operating the touch-points of said touch-point means in a predetermined sequence to derive successive responses for the operated touch-points; and in accordance with the responses, deriving output signals which can be perceived by a human, so that an output signal combination identifying a particular character is generated when touch-points pertaining to the same character are operated.

10. A device for presentation of digits, letters and other characters, comprising means for generating a number of input signals for each character, said input signals representing the character in a special code; a touch-point means comprising a number of manually operable touch-points for each character to be presented, said touch-point means receiving the input signals representing the character; and a signal means adapted to generate an output signal which can be perceived by a human, said touch-point means activating said signal means when a touch-point is operated and said touch-point means at the same time receives a predetermined signal combination from said input signal generating means.

* * * * *